(12) United States Patent (10) Patent No.: US 11,956,012 B2
Sato et al. (45) Date of Patent: Apr. 9, 2024

(54) FIBER BRANCH STRUCTURE FOR SPATIAL OPTICAL COMMUNICATION AND OPTICAL COMMUNICATION SYSTEM EQUIPPED WITH SAME

(71) Applicants: SHIMADZU CORPORATION, Kyoto (JP); Japan Agency for Marine-Earth Science and Technology, Yokosuka (JP)

(72) Inventors: Keiko Sato, Kyoto (JP); Naoki Nishimura, Kyoto (JP); Takao Sawa, Yokosuka (JP)

(73) Assignees: Shimadzu Corporation, Kyoto (JP); Japan Agency for Marine-Earth Science and Technolog, Yokosuka (JP)

( * ) Notice: Subject to any disclaimer, the term of this patent is extended or adjusted under 35 U.S.C. 154(b) by 28 days.

(21) Appl. No.: 17/792,517

(22) PCT Filed: Jan. 27, 2020

(86) PCT No.: PCT/JP2020/002852
§ 371 (c)(1),
(2) Date: Jul. 13, 2022

(87) PCT Pub. No.: WO2021/152679
PCT Pub. Date: Aug. 5, 2021

(65) Prior Publication Data
US 2023/0059214 A1 Feb. 23, 2023

(51) Int. Cl.
*H04B 10/116* (2013.01)
*H04B 10/112* (2013.01)
(Continued)

(52) U.S. Cl.
CPC ....... *H04B 10/116* (2013.01); *H04B 10/1129* (2013.01); *H04B 10/614* (2013.01); *H04B 10/801* (2013.01); *H04B 13/02* (2013.01)

(58) Field of Classification Search
None
See application file for complete search history.

(56) References Cited

U.S. PATENT DOCUMENTS

| | | | | |
|---|---|---|---|---|
| 5,684,614 A | * | 11/1997 | Degura | H04B 10/1121 398/32 |
| 6,347,001 B1 | * | 2/2002 | Arnold | H04B 10/118 398/124 |

(Continued)

FOREIGN PATENT DOCUMENTS

| | | |
|---|---|---|
| CN | 105790838 B | 7/2018 |
| JP | 2009-278455 A | 11/2009 |

(Continued)

OTHER PUBLICATIONS

Notice of reasons for refusal for corresponding application No. JP 2021-573652 dated Jul. 18, 2023.

(Continued)

*Primary Examiner* — Darren E Wolf
(74) *Attorney, Agent, or Firm* — Muir Patent Law, PLLC

(57) ABSTRACT

The present invention relates to a fiber branch structure for spatial optical communication for transmitting information by emitting communication light. The fiber branch structure is provided with: a light emitter configured to emit communication light; a light emission controller configured to control the light emitter; an optical fiber configured to transmit the light emitted from the light emitter; a distributor configured to distribute the light, the distributer being optically coupled to an output terminal of the optical fiber; and an optical fiber group optically coupled to a plurality of output terminals of the distributor. According to the present invention, a communication area can be established without blind spots. That is, the fiber branch structure for spatial optical communication according to the present invention includes an optical fiber group optically coupled to a plu- (Continued)

rality of output terminals of the distributor. A communication area can be established more assuredly by such an optical fiber group, which prevents the optical communication from being interrupted.

8 Claims, 3 Drawing Sheets

(51) Int. Cl.
*H04B 10/61* (2013.01)
*H04B 10/80* (2013.01)
*H04B 13/02* (2006.01)

(56) References Cited

U.S. PATENT DOCUMENTS

| | | | | |
|---|---|---|---|---|
| 2003/0228152 | A1* | 12/2003 | Takahashi | H04B 10/118 398/118 |
| 2006/0056855 | A1* | 3/2006 | Nakagawa | H04B 10/1141 398/183 |
| 2008/0205892 | A1* | 8/2008 | Baiden | H04B 13/02 398/104 |
| 2013/0201006 | A1* | 8/2013 | Kummetz | G06K 7/10019 340/10.1 |
| 2019/0305521 | A1 | 10/2019 | Nishi et al. | |
| 2020/0264389 | A1 | 8/2020 | Ishibashi et al. | |

FOREIGN PATENT DOCUMENTS

| | | |
|---|---|---|
| JP | 2011-254256 A | 12/2011 |
| JP | 2017-028572 A | 2/2017 |
| JP | 2018-007069 A | 1/2019 |
| JP | 2019-176046 A | 10/2019 |
| WO | 2017/104075 A1 | 6/2017 |
| WO | 2019/049598 A1 | 3/2019 |

OTHER PUBLICATIONS

Office Action dated Oct. 12, 2023 for corresponding patent application TW 110102621 (together with a machine translation).
Extended European Search Report for application No. EP 20916639 dated Sep. 14, 2023.

* cited by examiner

FIBER BRANCH STRUCTURE FOR SPATIAL OPTICAL COMMUNICATION AND OPTICAL COMMUNICATION SYSTEM EQUIPPED WITH SAME

TECHNICAL FIELD

The present invention relates to a fiber branch structure for spatial optical communication and an optical communication system equipped with the same.

BACKGROUND ART

Conventionally, as an optical communication system for transmitting information using light emitted in space, there is a system provided with an underwater moving body and an observation device installed on the seabed. The underwater moving body and the observation device of such an optical communication system are provided with a visible light emitting device that emits visible light and a visible light receiving device that receives visible light, respectively, and is configured to exchange information by sending and receiving the visible light between the visible light emitting device and the visible light receiving device (see, for example, Patent Document 1).

PRIOR ART DOCUMENT

Patent Document

Patent Document 1: Japanese Unexamined Patent Application Publication No. 2009-278455

SUMMARY OF THE INVENTION

Problems to be Solved by the Invention

However, the conventional configuration has a drawback that it cannot function sufficiently in the vicinity of a structure.

In a conventional configuration, it is assumed that there is nothing to block light between the moving body and the observation device. In an environment in which there is a structure that blocks the light between the moving body and the observation device, it can happen that the light emitted from the observation device is blocked by the structure, and therefore, the light fails to reach the moving body. In such a case, it becomes impossible to transmit information from the observation device to the moving body.

The present invention has been made in view of such circumstances. It is an object of the present invention to provide a configuration capable of assuredly transmitting information even in the presence of a structure.

Means for Solving the Problem

An embodiment of the present invention relates to a fiber branch structure for spatial optical communication for transmitting information by emitting communication light. The fiber branch structure for spatial optical communication is provided with:
  a light emitter configured to emit communication light;
  a light emission controller configured to control the light emitter;
  an optical fiber configured to transmit the light emitted from the light emitter;
  a distributor configured to distribute the light, the distributor being optically coupled to an output terminal of the optical fiber; and
  an optical fiber group optically coupled to a plurality of output terminals of the distributor.

Effects of the Invention

According to the present invention, a communication area can be established without blind spots. That is, the fiber branch structure for spatial optical communication according to the present invention is provided with an optical fiber group optically coupled to a plurality of output terminals of a distributor. The optical fiber group can assuredly ensure a communication area, and therefore, a situation in which the optical communication is interrupted does not occur.

EMBODIMENTS FOR CARRYING OUT THE INVENTION

Hereinafter, some embodiments for carrying out the present invention will be described with reference to the attached drawings. Note that in the embodiments, the term "underwater" denotes, for example, "in the seawater," "in the lake water," or the like. The term "water bottom" denotes, for example, a seabed, a lake bed, or the like. Further, the term "above-water" in the embodiments denotes, for example, "above-sea," "above-lake," or the like. It should be noted that each of the embodiments described below is an example of the present invention applied to the optical communication device for use in the water. Note that the present invention can also be applied to an optical communication device for use, e.g., on land.

Embodiments 1

Figure 1:
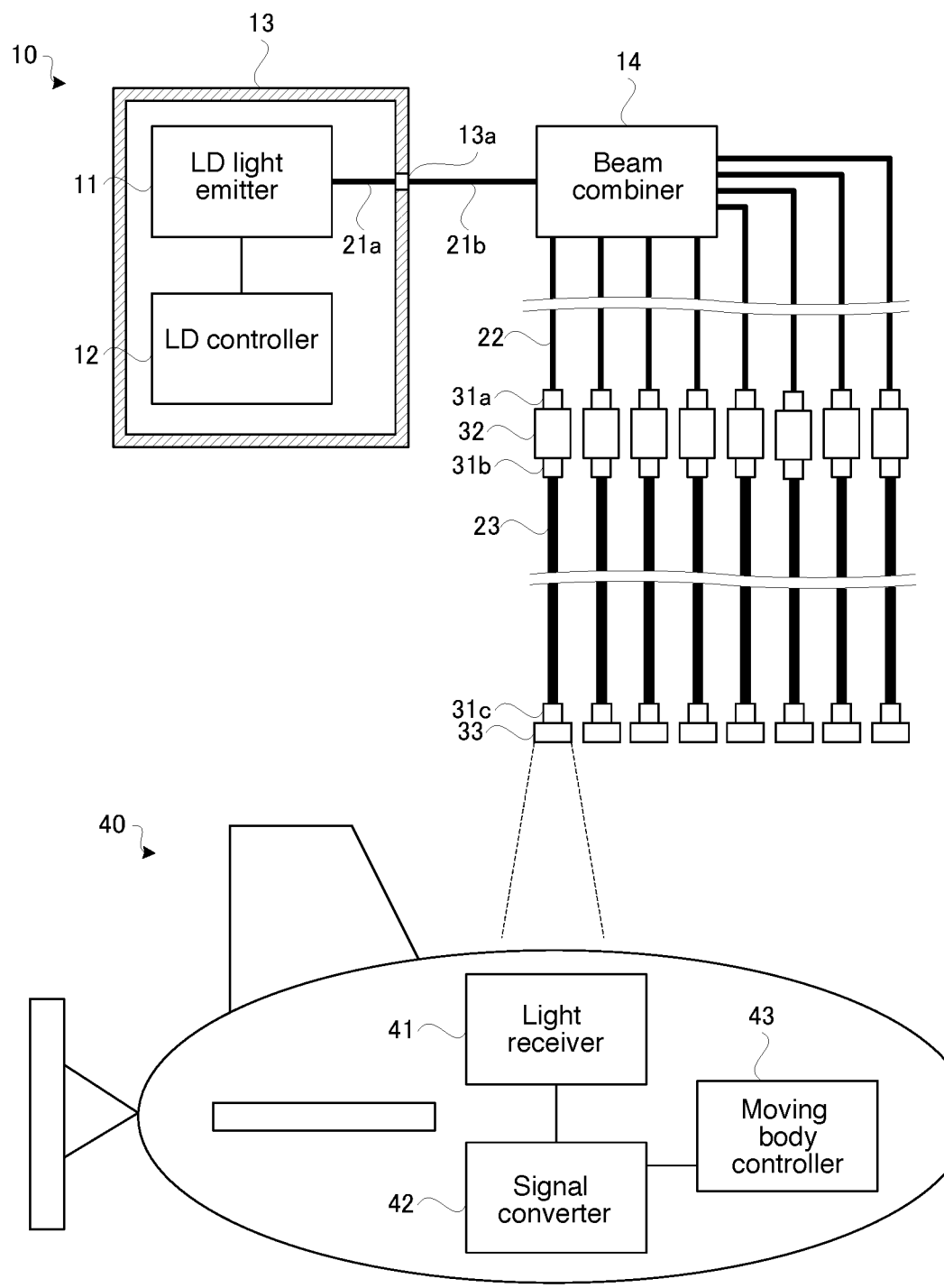
FIG. 1 is a functional block diagram illustrating an entire configuration of a fiber branch structure for spatial optical communication according to Embodiment 1.
Figure 2:
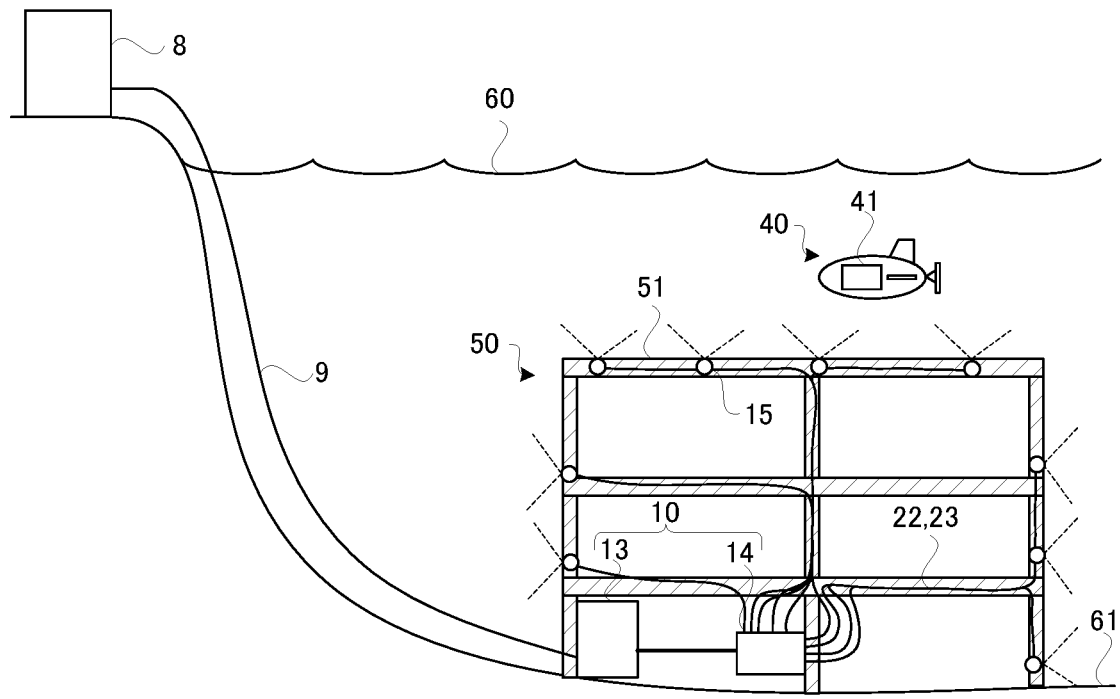
FIG. 2 is a conceptual diagram illustrating the status of use of the fiber branch structure for spatial optical communication according to Embodiment 1.

FIG. 1 is a schematic diagram of an optical communication system according to Embodiment 1. The optical communication system according to Embodiment 1 performs transmission of information by emitting communication light in the water. This optical communication system is provided with an underwater station 10 that transmits communication light and an underwater moving body 40 that receives the communication light. The underwater station 10 and the underwater moving body 40 are communication devices arranged in the water. The underwater station 10 is configured to be fixed to a structure 50 submerged in the water bottom, which will be described later. The underwater moving body 40 is, for example, an AUV (Autonomous Underwater Vehicle) and is an unmanned vehicle capable of being autonomously submersible. Such an underwater moving body 40 does not have wires to or from a submerged or above-water external station, and therefore, it can move more freely through the water. Further, the underwater moving body 40 can image the external configuration of the structure 50 by using a camera which will be described later. The underwater moving body 40 has a moving means, such as, e.g., a screw, and can move through the water. In addition, the optical communication system according to Embodiment 1 is provided with optical fibers 22 attached on the outer surface of the structure 50 in a dispersed manner, an underwater cable 9, and an above-water base station 8. These configurations are shown in FIG. 2. The underwater station 10 corresponds to the "optical communication device" of the present invention. The base station 8 corresponds to the "external station" of the present invention, and the underwater moving body 40 corresponds to the "moving body" of the present invention. A specific example of the moving body in a case where the moving body is not arranged in water (e.g., arranged on land), can be represented by, for example, an unmanned vehicle.

First, the configuration of the underwater station 10 will be described. The underwater station 10 is a relay station capable of communicating with the outside and is provided with an LD light emitter 11 (Laser Diode light emitter) having a semiconductor light-emitting element for emitting communication light, and an LD controller 12 for controlling the LD light emitter 11. The LD light emitter 11 activates the semiconductor light-emitting element by the current outputted from the LD controller 12 to emit laser light. This laser light flashes under the control of the LD controller 12. This flashing is the result of converting digital data. The light outputted from the LD light emitter 11 as described above is communication light of digital data. The LD light emitter 11 corresponds to the "light emitter" of the present invention, and the LD controller 12 corresponds to the "light emission controller" of the present invention. The LD controller 12 is realized by a processor.

The communication light is, for example, visible light of green and blue that is easy to propagate through the water. For the communication light in a case where a relay station is not arranged in the water (e.g., arranged on the land), there is no need to consider the underwater transmission.

The LD light emitter 11 and the LD controller 12 are accommodated in a water-resistant, pressure-resistant protection container 13 in a state in which the water-tightness is maintained. The protection container 13 has an underwater connector 13a for guiding the communication light outputted from the LD light emitter 11 to the outside of the protection container 13. Like the protection container 13, the underwater connector 13a has water resistance and pressure resistance. Therefore, even in a case where the protection container 13 is submerged and mounted on the bottom of the sea, the protection container 13 withstands the water pressure and prevents water immersion to the inside of the protection container 13. The LD light emitter 11 transmits communication light to a beam combiner 14, which will be described later, located outside the protection container 13. In a case where the relay station is not placed in the water (for example, the relay station is placed on the land), the protection container 13 may not be configured to have water resistance and pressure resistance.

The manner in which the communication light emitted from the LD light emitter 11 is transmitted will be described. The communication light outputted from the LD light emitter 11 is directed to the underwater connector 13a through the optical fiber 21a optically coupled to the output terminal of the LD light emitter 11. The terminal (output terminal) of the optical fiber 21a on the opposite side of the LD light emitter 11 is optically coupled to the underwater connector 13a.

To the outer terminal (output terminal) of the underwater connector 13a on the outer side of the protection container 13, an optical fiber 21b is optically coupled. The terminal (output terminal) of the optical fiber 21b on the opposite side of the underwater connector 13a is optically coupled to a beam combiner 14, which will be described later. Therefore, the communication light emitted from the LD light emitter 11 is guided to the beam combiner 14 via the optical fiber 21a, the underwater connector 13a, and the optical fiber 21b. The beam combiner 14 corresponds to the "distributor" of the present invention.

The beam combiner 14 is a distributor that distributes the communication light. The beam combiner 14 has a plurality of communication light output ends for one communication light input end. When communication light is inputted to the beam combiner 14, the same communication light is outputted from the plurality of communication light output ends at the same time. Note that the beam combiner 14 shown in FIG. 1 is provided with eight communication light output ends. In Embodiment 1, the number of communication light output ends can be appropriately increased or decreased.

To each of the communication light outputting ends of the beam combiner 14, an optical fiber 22 is optically coupled. In the case of FIG. 1, the beam combiner 14 has eight communication light output ends, and therefore, there exist eight optical fibers 22. These optical fibers 22 correspond to the "optical fiber group" in the present invention.

The configuration of the ends of the eight optical fibers 22 on the opposite side of the beam combiner 14 will be described. As shown in FIG. 1, the terminal (output terminal) of the optical fiber 22 on the opposite side of the beam combiner 14 is optically coupled to a coated optical fiber 23 via an adapter 32. A connector 31a provided at the end of the optical fiber 22 and a connector 31b provided at the end of the coated optical fiber 23 allow optical fibers to be connected to the adapter 32.

The coated optical fiber 23 is provided with a central optical fiber and a protective layer covering the optical fiber. The coated optical fiber 23 has physically strong properties as compared with a normal optical fiber. The coated optical fiber 23 is, for example, a patch cord. Each of the optical fibers 22 constituting the optical fiber group is in communication with the coated optical fiber 23 equipped with a patch cord.

The terminal (output terminal) of the coated optical fiber 23 on the opposite side of the adapter 32 is optically coupled to a receptacle 33. The receptacle 33 forms an output terminal of the coated optical fiber 23 to which an angle adjuster 15, which will be described later, is attached. In FIG. 1, the illustration of the angle adjuster 15 is omitted, and therefore, it is illustrated as if the communication light is outputted directly from the receptacle 33. Note that in FIG. 1, it is illustrated such that communication light is emitted only from the leftmost receptacle 33, but the actual communication light is simultaneously emitted from all of the receptacles 33. A connector 31c attached to the end of the coated optical fiber 23 allows the connection of the coated optical fiber 23 to the receptacle 33.

Next, the underwater moving body 40 will be described. The underwater moving body 40 is provided with a light receiver 41 for receiving the communication light outputted from the LD light emitter 11, a signal converter 42 for converting communication light into an electric signal based on the light reception result of the light receiver 41, and a moving body controller 43 for controlling the driving of a motor or the like mounted on the underwater moving body 40. The communication light outputted from the LD light emitter 11 is also communication light emitted from a structure 50, which will be described later.

The underwater moving body 40 can change, for example, the traveling direction in response to the above-described communication light. This will be described. For example, it is assumed that the LD controller 12 makes the LD light emitter 11 emit communication light that instructs turning to the underwater moving body 40. This communication light is emitted into the water via the coated optical fibers 23 or the like. The underwater moving body 40 receives this communication light by the light receiver 41. The signal converter 42 then converts the communication light into an electric signal that means turning. The moving body controller 43 controls, in accordance with the electric signal, the motor or the like mounted on the underwater moving body 40 such that the underwater moving body 40 turns. Note that the signal converter 42 and the moving body controller 43 are realized by a processor.

FIG. 2 illustrates the state in which the underwater station 10 and the underwater moving body 40 are used underwater. Thus, the underwater station 10 and the underwater moving body 40 are arranged below the water surface 60. The structure 50 shown in FIG. 2 is configured by assembling elongated frames 51 and is a structure, such as, e.g., a manifold, for developing a bottom oil field to be installed on a water bottom 61.

The underwater station 10 is arranged in the structure 50. The protection container 13 of the underwater station 10 is communicated with the above-water base station 8 via the underwater cable 9. The underwater cable 9 supplies power from the base station 8 to the inside of the protection container 13 and transmits a control signal from the base station 8 for controlling the LD controller 12. Operating the human interface of the base station 8 allows the remote operation of the underwater moving body 40. The underwater cable 9 supplies electric power to the LD light emitter 11 and the LD controller 12 and is used when the LD controller 12 communications with the above-water base station. The underwater cable 9 corresponds to the "cable" of the present invention.

The above-described optical fibers 22 and 23 are wired on the structure 50. The tip ends of the optical fibers 22 and 23 are each optically coupled to an angle adjuster 15 via the above-described receptacle 33. The angle adjuster 15 has an emission port for communication light. The angle adjuster 15 has a configuration capable of adjusting the angle of the emission port for the communication light so that the communication light transmitted through the optical fibers 22 and 23 diverges in a predetermined direction in the water. The emission port of the angle adjuster 15 radially emits the communication light with a certain spread angle as indicated by the dashed line in FIG. 2. The angle adjuster 15 is configured to adjust the angle of each emission port at the distal end of the optical fiber 22, 23 with respect to the structure 50. The angle adjusters 15 are arranged at different locations of the structure 50. In this way, it is possible to differentiate the light-emission sources of the communication light emitted from the angle adjusters 15 from each other. Note that the angle adjuster 15 corresponds to the "adjuster" of the present invention.

The coated optical fiber 23 will be described. Various devices are mounted on the frame 51 of the structure 50. Some of these devices are mounted so as to project from the structure 50. Even in a case where the angle adjuster 15 is attached to such a device, optical fibers are wired from the main body of the structure 50. According to Embodiment 1, the coated optical fiber 23 is used for the optical fiber extending outward from the main body of the structure 50. This makes the underwater station 10 more shock-resistant.

The installation state of the angle adjuster 15 will be described. A plurality of angle adjusters 15 is arranged on the outer surface of the structure 50 in a dispersed manner so that the communication with the underwater moving body 40 is not interrupted. That is, according to Embodiment 1, the structure 50 entirely illuminates with communication light, and therefore, the underwater moving body 40 positioned in the vicinity water area of the structure 50 can receive the communication light emitted from any of the angle adjusters 15 by the light receiver 41 at all times. For example, when a turning instruction is issued in the base station 8 to the underwater station 10 via the underwater cable 9, the underwater moving body 40 receives the communication light relating to the turning instruction from any of the angle adjusters 15 and turns.

As described above, according to Embodiment 1, it is possible to provide an optical communication device capable of establishing a communication area underwater without blind spots. That is, the optical communication device according to Embodiment 1 is provided with a plurality of optical fibers 22 optically coupled to the plurality of communication light output ends of the beam combiner 14, the plurality of optical fibers being capable of being attached to the underwater structure. Since it is possible to make the structure 50 itself illuminate by the plurality of optical fibers 22, the structure 50 does not block the optical communication, and therefore, a situation in which the optical communication is interrupted by the structure 50 does not occur.

Embodiments 2

Subsequently, Embodiment 2 will be described. Embodiment 2 is similar in the configuration to Embodiment 1 but differs from Embodiment 1 in that the beam combiner 14 is provided within the protection container 13. According to the configuration of Embodiment 2, the protection container 13 accommodates the beam combiner 14 and the LD light emitter 11 in a water-tight manner.

Figure 3:
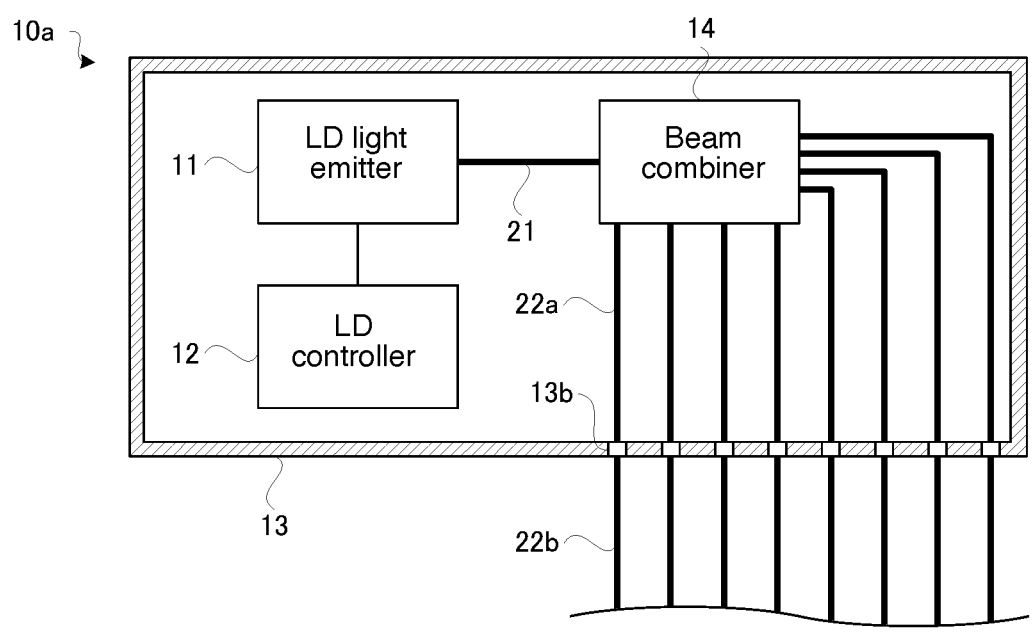
FIG. 3 is a functional block diagram illustrating the configuration of the fiber branch structure for spatial optical communication according to Embodiment 2.

As shown in FIG. 3, the underwater station 10*a* according to Embodiment 2 has an optical fiber 21 optically connecting the LD light emitter 11 and the beam combiner 14. Then, each of the communication light output ends of the beam combiner 14 is optically coupled to an optical fiber 22*a* within the protection container 13. The communication light inputted to the optical fiber 22*a* is directed to the underwater connectors 13*b* provided corresponding to the respective optical fibers 22*a*. The terminal (output terminal) of the optical fiber 22*a* on the opposite side of the beam combiner 14 is optically coupled to the underwater connector 13*b*.

To the outer terminal (output terminal) of the underwater connector 13*a* on the outer side of the protection container 13, an optical fiber 22*b* is optically coupled. The configuration of the tip end portion of the optical fiber 22*b* is similar to that of the optical fiber 22 in Embodiment 1.

As described above, according to Embodiment 2, it is possible to provide an optical communication device capable of protecting the beam combiner 14 from water with few failures.

Embodiment 3

Embodiment 3 is configured such that a function of receiving communication light from the underwater moving body 40 is added to the configuration of Embodiment 1. Therefore, the configuration for transmitting the communication light in Embodiment 3 is the same as that in Embodiment 1.

Figure 4:
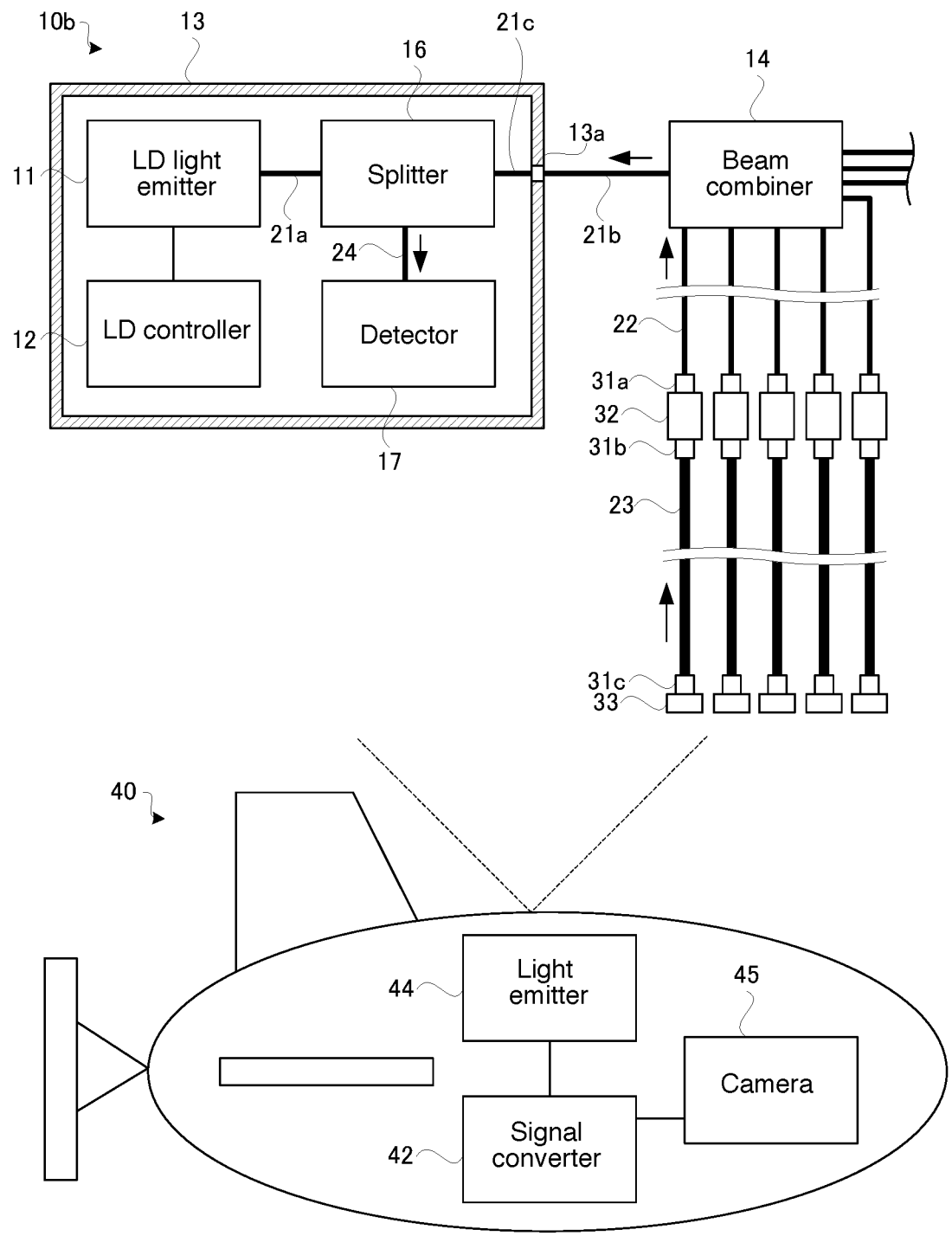
FIG. 4 is a functional block diagram illustrating the entire configuration of the fiber branch structure for spatial optical communication according to Embodiment 3.

FIG. 4 shows an underwater station 10b according to Embodiment 3. The underwater station 10b is provided with: a splitter 16 for allowing communication light emitted from the LD light emitter 11 to pass therethrough in the protection container 13; and a detector 17 for detecting the communication light received by the underwater station 10b from the underwater moving body 40. Thus, the splitter 16 is positioned between the LD light emitter 11 and the beam combiner 14.

The communication light outputted from the LD light emitter 11 is directed to the splitter 16 via the optical fiber 21a optically coupled to the output terminal of the LD light emitter 11. The terminal (output terminal) of the optical fiber 21a on the opposite side of the LD light emitter 11 is optically coupled to the splitter 16.

The communication light outputted from the splitter 16 is directed to the underwater connector 13a via the optical fiber 21c optically coupled to the output terminal of the splitter 16. The terminal (output terminal) of the optical fiber 21c on the opposite side of the splitter 16 is optically coupled to the underwater connector 13a.

To the end terminal (output terminal) of the underwater connector 13a of the protection container 13, the optical fiber 21b is optically coupled. The terminal (output terminal) of the optical fiber 21b on the opposite side of the underwater connector 13a is optically coupled to the beam combiner 14. Therefore, the communication light emitted from the LD light emitter 11 is directed to the beam combiner 14 via the optical fiber 21a, the splitter 16, the optical fiber 21c, the underwater connector 13a, and the optical fiber 21b.

The splitter 16 has, in addition to the output terminal for outputting the communication light from the LD light emitter 11, another output terminal connected to the detector 17 for detecting the communication light from the underwater moving body 40. That is, the splitter 16 is connected to the detector 17 via an optical fiber 24. The detector 17 is configured to detect the communication light to output an electric signal.

The splitter 16 will be described in more detail. Of the two output terminals of the splitter 16, the output terminal connected to the underwater connector 13a is referred to as a first output terminal, and the output terminal connected to the detector 17 will be referred to as a second output terminal. To the input terminal of the splitter 16, the communication light from the underwater moving body 40 having a wavelength different from that of the communication light from the LD light emitter 11 does not enter. Instead, the communication light from the underwater moving body 40 reaches the detector 17. The properties of such a splitter 16 is due to the difference between the wavelength of the communication light from LD light emitter 11 and the wavelength of the communication light from the underwater moving body 40. That is, the splitter 16 has a function of splitting two types of light having different wavelengths that has passed through the optical fibers.

The underwater station 10b according to Embodiment 3 can receive video data of a camera 45 mounted on the underwater moving body 40. This will be described below. The underwater moving body 40 will be provided with a camera 45 for imaging the underwater state that can be confirmed from the underwater moving body 40. The camera 45 captures a real-time moving image to generate moving image data and transmits the data to a signal converter 42 mounted on the underwater moving body 40.

The signal converter 42 receives the moving image data as electric signals and converts the moving image data into an optical signal. The produced communication light is emitted into the water via the light emitter 44. At this time, the communication light emitted by the light emitter 44 is radially extended light with a spread to some extent, as indicated by the broken line in FIG. 4, and the wavelength is different from the wavelength of the communication light emitted by the underwater station 10b.

The communication light of the underwater moving body 40 is incident on the angle adjusters 15 mounted at various positions of the structure 50 and is directed to the splitter 16 via the path opposite to the path for the light emitter 11 in Embodiment 1. The manner in which the communication light from the underwater moving body 40 is directed toward the splitter 16 is indicated by an arrow in FIG. 4. Therefore, the first output terminal in the splitter 16 also serves as an input terminal for inputting the communication light from the underwater moving body 40. Note that in FIG. 4, the underwater station 10b is illustrated by omitting the angle adjusters 15.

The splitter 16 has a configuration for outputting light having a predetermined wavelength from the input terminal, and the wavelength of the communication light from the underwater moving body 40 is not a wavelength that can be emitted from the input terminal. Therefore, the communication light from the underwater moving body 40 inputted to the splitter 16 is never directed to the side of the LD light emitter 11. Instead, the communication light from the underwater moving body 40 is incident on the detector 17 via the second output terminal. The detector 17 converts the communication light from the underwater moving body 40 into an electric signal and transmits the signal to the above-water base station 8 via the underwater cable 9. In the above-water base station 8, it is possible to confirm the state of the underwater moving body 40 in the water in real time. Thus, the detector 17 is configured to be optically coupled to the output terminal (second output terminal) for outputting the light having a wavelength different from the light outputted from the LD light emitter 11 in the splitter 16d to detect the communication light from the underwater moving body 40.

As described above, according to Embodiment 3, it is possible to provide an optical communication device capable of sending and receiving more assuredly. That is, the optical communication device according to Embodiment 3 is provided with a plurality of optical fibers 22 capable of being attached to the submerged structure for receiving the communication light from the underwater moving body 40. Since it is possible to operate the entire structure 50 as a receiver by such a plurality of optical fibers 22, a situation in which the optical communication is interrupted by the structure 50 does not occur.

The present invention is not limited to the above-described embodiments and can be modified as described below.

(1) The tips of the optical fibers 22 and 23 in each embodiment are optically coupled to the angle adjuster 15, but the present invention is not limited to this configuration. It may be configured such that the tip end of the optical fiber 22, 23 is not fixed to the angle adjuster 15 and that the optical fiber is wired by winding the optical fiber on the frame 51 of the structure 50. In this case, it may be configured not to include the angle adjuster 15.

(2) The optical fiber 22, 23 in each embodiment is wired on the structure 50, but the present invention can also be applied to a configuration in which the optical fiber is not wired on the structure 50. For example, the tip of the optical fiber 22, 23 may be installed on the ground or on the water bottom. It is also possible to install the optical fiber 22, 23 above the communication area and use the optical fiber 22, 23 in a hanging manner. Alternatively, a structure for mounting the optical fiber may be provided separately from the structure 50.

(3) In Embodiment 3, the beam combiner 14 is arranged outside the protection container 13, but it may be configured such that the beam combiner 14 is accommodated within the protection container 13 as in Embodiment 2 while adopting the configuration of Embodiment 3.

(4) Although the beam combiner 14 is provided in each embodiment, the present invention is not limited to this configuration. Any components having a function of distributing light, other than the beam combiner 14, may be used.

(5) Although the base station 8 in each embodiment is installed on the land, the present invention is not limited to this configuration. The base station 8 may be installed on a ship.

It will be appreciated by those skilled in the art that the plurality of exemplary embodiments described above are specific examples of the following aspects.

A fiber branch structure for spatial optical communication according to one aspect of the present invention relates to a fiber branch structure for spatial optical communication for transmitting information by emitting communication light. The fiber branch structure includes:
  a light emitter configured to emit communication light;
  a light emission controller configured to control the light emitter;
  an optical fiber configured to transmit the light emitted from the light emitter;
  a distributor configured to distribute the light, the distributor being optically coupled to an output terminal of the optical fiber; and
  an optical fiber group optically coupled to a plurality of output terminals of the distributor.

According to the above-described invention, a communication area can be established without blind spots. That is, the present invention is provided with an optical fiber group optically coupled to a plurality of output terminals of the distributor. The optical fiber group allows the communication area to be illuminated with the communication light without fail, thus ensuring reliable optical communication.

In the fiber branch structure for spatial optical communication according to the above-described aspect,
  the optical fiber group is configured to be attachable to a structure.

According to the above-described invention, it is possible to illuminate the structure itself with the communication light, and therefore, a situation in which the optical communication is interrupted by the structure does not occur.

The fiber branch structure for spatial optical communication according to the above-described aspect may further include:
  a cable configured to supply power to the light emitter and the light emission controller and communication with an outside.

According to the above-described invention, it is possible to assuredly operate the light emitter and the light emission controller.

The fiber branch structure for spatial optical communication according to the above-described aspect may further include:
  an adjuster configured to adjust an angle of each of emission ports provided at an end of the optical fiber group with respect the structure.

According to the above-described invention, it is possible to illuminate the periphery of the structure with communication light without fail.

In the fiber branch structure for spatial optical communication according to the above-described aspect,
  each of optical fibers constituting the optical fiber group may be connected to an optical fiber having a patch cord.

According to the above-described invention, it is possible to protect the tip of the optical fiber group which is particularly susceptible to impact.

In the fiber branch structure for spatial optical communication according to the above-described aspect,
  the communication light may be emitted underwater.

According to the above-described invention, it is possible to assuredly establish the communication area in water.

The fiber branch structure for spatial optical communication according to the above-described aspect may further include:
  a protection container configured to accommodate the light emitter in a water-tight manner,
  wherein the light emitter transmits the light to the distributor located outside the protection container According to the above-described invention, the malfunction of the light emitter can be assuredly suppressed. Further, according to the above-described invention, since the protection container can be configured only by providing a single underwater connector, an inexpensive device can be provided.

The fiber branch structure for spatial optical communication according to the above-described aspect may further include:
  a protection container configured to accommodate the distributor and the light emitter in a water-tight manner.

According to the above-described invention, it is possible to provide a device in which the malfunction of the distributor and the light emitter can be assuredly suppressed.

The fiber branch structure for spatial optical communication according to the above-described aspect may further include:
  a splitter arranged between the light emitter and the distributor to split two types of light having different wavelengths passing through the optical fiber, the splitter being configured to transmit the light emitted by the light emitter to the optical fiber group, the splitter being provided with an output terminal for outputting light having a wavelength different from a wavelength of the light emitted by the light emitter, the light being transmitted via the distributor from the optical fiber group; and
  a detector configured to detect the light having the wavelength different from the wavelength of the light outputted from the light emitter, the detector being optically coupled to an output terminal of the splitter.

According to the above-described invention, it becomes possible to perform sending and receiving more assuredly. That is, according to the above-described invention, it includes an optical fiber group for receiving the communication light. Such an optical fiber group allows the reception of the communication light all over the communication area, thus ensuring reliable optical communication.

In an optical communication system equipped with the fiber branch structure for spatial optical communication according to the above-described aspect, it may be configured such that:

the optical fiber group is attached to an outer surface of a structure in a dispersed manner, and the optical communication system further includes:

a moving body equipped with a light receiver for receiving communication light emitted from the optical fiber group attached to the structure; and an external station configured to supply power to the light emitter and the light emission controller and remotely control the moving body by communicating with the light emission controller via the cable.

According to the above-described invention, it is possible to provide an optical communication device capable of establishing a communication area of the moving body without blind spots. That is, the optical communication system according to the present invention has a distributor for distributing the communication light obtained by converting the information from the external station. The present invention further includes an optical fiber group optically coupled to a plurality of output terminals of the distributor. This type of the optical fiber group allows the communication area to be illuminated with the communication light without fail, thus ensuring reliable optical communication.

DESCRIPTION OF SYMBOLS

11: LD light emitter (light emitter)
12: LD controller (light emission controller)
14: Beam combiner (distributor)
21: Optical fiber
22: Optical fiber (optical fiber group)

The invention claimed is:

1. A fiber branch structure for spatial optical communication for transmitting information by emitting communication light, comprising:

a light emitter configured to emit communication light;
a light emission controller configured to control the light emitter;
an optical fiber configured to transmit the light emitted from the light emitter;
a distributor configured to distribute the light, the distributor being optically coupled to an output terminal of the optical fiber;
an optical fiber group optically coupled to a plurality of output terminals of the distributor; and
a protection container configured to accommodate the light emitter in a water-tight manner,
wherein the light emitter transmits the light to the distributor located outside the protection container.

2. The fiber branch structure for spatial optical communication as recited in claim 1, further comprising:

a cable configured to supply power to the light emitter and the light emission controller and allow communication with a device external to the fiber branch structure.

3. The fiber branch structure for spatial optical communication as recited in claim 1, further comprising:

an adjuster configured to adjust an angle of each of emission ports provided at an end of the optical fiber group.

4. The fiber branch structure for spatial optical communication as recited claim 1, wherein each of optical fibers constituting the optical fiber group is connected to an optical fiber having a patch cord.

5. The fiber branch structure for spatial optical communication as recited in claim 1, wherein the communication light is emitted underwater.

6. A fiber branch structure for spatial optical communication for transmitting information by emitting communication light, comprising:

a light emitter configured to emit communication light;
a light emission controller configured to control the light emitter;
an optical fiber configured to transmit the light emitted from the light emitter;
a distributor configured to distribute the light, the distributor being optically coupled to an output terminal of the optical fiber;
an optical fiber group optically coupled to a plurality of output terminals of the distributor;
a splitter arranged between the light emitter and the distributor to split two types of light having different wavelengths passing through the optical fiber, the splitter being configured to transmit the light emitted by the light emitter to the optical fiber group, the splitter being provided with an output terminal for outputting light having a wavelength different from a wavelength of the light emitted by the light emitter, the light being transmitted via the distributor from the optical fiber group; and
a detector configured to detect the light having the wavelength different from the wavelength of the light outputted from the light emitter, the detector being optically coupled to the output terminal of the splitter.

7. An optical communication system comprising:

a light emitter configured to emit communication light;
a light emission controller configured to control the light emitter;
an optical fiber configured to transmit the light emitted from the light emitter;
a distributor configured to distribute the light, the distributor being optically coupled to an output terminal of the optical fiber;
an optical fiber group optically coupled to a plurality of output terminals of the distributor;
a protection container configured to accommodate the light emitter in a water-tight manner;
a moving body equipped with a light receiver for receiving the communication light emitted from the optical fiber group; and
an external station configured to supply power to the light emitter and the light emission controller and remotely control the moving body by communicating with the light emission controller via a cable,
light emitter transmits the light to the distributor located outside the protection container.

8. The optical communication system of claim 7, further comprising:

a splitter arranged between the light emitter and the distributor to split two types of light having different wavelengths passing through the optical fiber, the splitter being configured to transmit the light emitted by the light emitter to the optical fiber group, the splitter being provided with an output terminal for outputting light having a wavelength different from a wavelength of the light emitted by the light emitter, the light being transmitted via the distributor from the optical fiber group; and
a detector configured to detect the light having the wavelength different from the wavelength of the light outputted from the light emitter, the detector being optically coupled to the output terminal of the splitter.

* * * * *